United States Patent [19]
Yohe et al.

[11] Patent Number: 6,122,637
[45] Date of Patent: *Sep. 19, 2000

[54] APPARATUS AND METHOD FOR INCREASED DATA ACCESS IN AN OBJECT ORIENTED CACHING SYSTEM

[76] Inventors: Thomas Patrick Yohe, 7675 Bigger Rd., Centerville, Ohio 45459; Brian C. Morris, 1525 Palm Valley #1208, Round Rock, Tex. 78664

[*] Notice: This patent is subject to a terminal disclaimer.

[21] Appl. No.: 08/888,231

[22] Filed: Jul. 3, 1997

Related U.S. Application Data

[63] Continuation-in-part of application No. 08/565,393, Nov. 30, 1995, Pat. No. 5,682,415.

[51] Int. Cl.⁷ .................................................. G06F 15/173
[52] U.S. Cl. ............................ 707/103; 707/3; 707/10; 395/200.33; 395/200.47; 395/200.57; 395/683; 711/118
[58] Field of Search ................................ 707/10, 103, 3; 395/200.33, 200.38, 200.43, 200.47, 200.57, 683; 711/118

[56] References Cited

U.S. PATENT DOCUMENTS

| | | | |
|---|---|---|---|
| 4,410,944 | 10/1983 | Kronies | 364/200 |
| 5,151,989 | 9/1992 | Johnson et al. | 395/600 |
| 5,222,224 | 6/1993 | Flynn et al. | 395/425 |
| 5,226,143 | 7/1993 | Baird et al. | 395/425 |
| 5,261,069 | 11/1993 | Wilkinson et al. | 395/425 |
| 5,274,787 | 12/1993 | Hirano et al. | 395/425 |
| 5,276,835 | 1/1994 | Mohan et al. | 395/425 |
| 5,297,269 | 3/1994 | Donaldson et al. | 395/425 |
| 5,301,290 | 4/1994 | Tetzlaff et al. | 395/425 |
| 5,394,555 | 2/1995 | Hunter et al. | 395/800 |
| 5,404,483 | 4/1995 | Stamm et al. | 315/425 |
| 5,428,761 | 6/1995 | Herlihy et al. | 395/425 |
| 5,452,447 | 9/1995 | Nelson et al. | 395/650 |
| 5,559,984 | 9/1996 | Nakano et al. | 395/448 |
| 5,577,252 | 11/1996 | Nelson et al. | 395/670 |
| 5,581,704 | 12/1996 | Barbara et al. | 395/200.09 |
| 5,642,515 | 6/1997 | Jones et al. | 395/727 |
| 5,682,514 | 10/1997 | Yohe et al. | 395/455 |
| 5,689,638 | 11/1997 | Sadovsky | 395/188.01 |
| 5,706,435 | 1/1998 | Barbara et al. | 711/141 |
| 5,737,536 | 4/1998 | Herrmann et al. | 395/200.59 |
| 5,835,943 | 11/1998 | Yohe et al. | 711/118 |

OTHER PUBLICATIONS

Barbara, et al., "Sleepers and workaholics: Caching strategies in mobile environments", SIGMOD Record, vol. 23, No. 2, Abstract Only, Jun. 1994.

*Primary Examiner*—Jean R. Homere
*Attorney, Agent, or Firm*—R. William Graham

[57] ABSTRACT

An apparatus having an object server computer having an operating system, a first memory, a permanent storage memory and a processor with a module for performing an operation on a predetermined object data stored in the permanent storage memory of the object server computer to produce an object server computer signature of the predetermined object data and a remote client computer operably associated with the object server computer having an operating system, a first memory, a cache memory and a processor with a module for performing an operation on like predetermined object data stored in the cache memory and recalling signature of the like predetermined object data, and a comparator operably associated with the remote client computer for comparing the signature of the predetermined object data with signature of the like predetermined object data to determine whether the signature of the like predetermined object data is valid.

6 Claims, 4 Drawing Sheets

APPARATUS AND METHOD FOR INCREASED DATA ACCESS IN AN OBJECT ORIENTED CACHING SYSTEM

This is a continuation-in-part of U.S. Ser. No. 08/565,393 filed Nov. 30, 1995, now issued into U.S. Pat. No. 5,682,415 on Oct. 28, 1997.

BACKGROUND OF THE INVENTION

1. Field of the Invention

The present invention relates to data access in an object oriented network system. More Particularly, the present invention is directed to a client-server utility which increases the speed in which data is accessed across a communications link via remote node caching and verifying.

2. Related Art

Many operating systems are equipped to handle caching and verifying of data. Traditionally, in a remote client's caching system, optimization in retrieving data is limited to prefetching. In other words, an application program in a remote client requests from an object server transmission of a predetermined number of bytes of information (e.g., x bytes) and the operating system on the client prefetches the requested data plus another number of bytes of information (e.g., x+y bytes). Thus, when the application requests the bytes, it already exists in its readily accessible memory (cache).

As shown in FIG. 1, the related art includes a remote client computer having an operating system (OS) with an object interface (OI). Operatively connected to the OI is a local file system (LFS) which in turn is operatively connected to a RAM based disk server (RBDC), disk driver (DD) and permanent storage disk (PSD). Also, operatively connected to the OI is an object retriever (OR) which is connected to a network transport layer (NTL) which is connected to a LAN driver. Aside from the OS, there exist application programs (AP) which employ the OS via the OI. A LAN communication link (LAN LINK) connects the remote client computer to the object server computer.

The object server computer has a LAN driver connected to the LAN LINK, an OS operatively associated with an NTL connected to the LAN driver and an OI connected to an object database (ODB) which in turn is connected to DD and PSD. Aside from the OS, there exists an object server application which employs the OS via the OI.

The problem associated with these prior systems is their inability to provide a remote client user with greater speed of access to object server data. In this regard, the bandwidth of the LAN link is often saturated with the fulfillment of duplicated object retrieval requests by an object server which emanated from remote clients. Another problem is that objects returned by the object server are often returned as disparated sub-objects which must be re-assembled into a contiguous object before presentation of the object to the application program is possible. This is also due partially to the amount of object data which is being transmitted across the LAN LINK and the present methods of updating the object data. Presently, the object server computer serves as the mechanism whereby the data request is verified and subsequently transmitted to the remote client computer.

In the context of the present invention, "remote client" is defined as a user either accessing data over a relatively slow link, such as a modem phone link, or over a relatively high speed link, such a LAN link. A typical modem phone link provides a transfer rate of about 28.8 kilobits of information per second. This is contrasted with a link in a LAN connection which can transfer at about 10 Megabits per second. These remote clients are thus dependent upon the type of communications link they are using in terms of speed of accessing data. In any event, there remains a continuing need to increase the speed of accessing data from a remote site or node and to reduce the amount of network traffic on the LAN.

SUMMARY OF THE INVENTION

The present invention overcomes the above described deficiencies which exist with remote clients accessing data from an object oriented network environment.

It is an objective to increase the speed in which a remote client can access object data.

It is another objective to maintain integrity of the accessed object data while increasing the speed in which the object data is accessed.

Still, another objective is to add intelligence to a remote client in order to reduce the overall time in which a remote client accesses data.

Another objective is to overcome the deficiencies of object data transfer for a remote client.

Another objective is to reduce the amount of traffic which flows over a LAN.

Still another objective is to add efficiencies to presentation of objects to an application program in cases by presenting an object to the application as a continuous stream of data rather than as collection of disparate sub-objects.

Other objectives and advantages will be readily apparent from reading the following description and viewing the drawings.

Accordingly, the present invention is directed to an apparatus for increased data access in an object oriented network. The apparatus includes an object server computer having an operating system, a first memory, a permanent storage memory and a processor with means for performing an operation on a predetermined object data stored in said permanent storage memory of the object server computer to produce an object server computer signature of the predetermined object data. The apparatus also includes a remote client computer operably associated with the object server computer having an operating system, a first memory, a cache memory and a processor with means for performing an operation on like predetermined object data stored in the cache memory and recalling signature of the like predetermined object data, and a comparator operably associated with the remote client computer for comparing the signature of the predetermined object data with signature of the like predetermined object data to determine whether the signature of the like predetermined object data is valid. Additionally, the remote client computer includes means responsive to each comparison performed by the comparator on the data for generating and storing a validation ratio for the data in the first memory and for removing the data from the cache memory when the validation ratio drops below a predetermined value.

A method is also provided which is directed to computers in an object oriented network for increased speed of access of data. The method includes using an object server computer having an operating system, a first memory, a permanent storage memory and a processor with means for performing an operation on a predetermined object data stored in the permanent storage memory of the object server computer to produce an object server computer signature of the object data, using a remote client computer operably associated with the object server computer having an operating system, a first memory, a cache memory and a processor with means for performing an operation on like predetermined object data stored in the cache memory and recalling signature of the like predetermined object data, and a comparator operably associated with the remote client computer for comparing the signatures of object data with one another to determine whether the signature of data of the remote client is valid, establishing a processor element in the object server computer which recognizes a GET request by the remote client computer for the predetermined object data and obtains the object data and an associated a signature of the data, establishing a processor element on the remote client computer which initiates upon a GET request from the cache memory therein and obtains the like predetermined object data having an associated signature of the object data, and using a comparator operably associated with the remote client computer for comparing the signature of predetermined object data with the signature of the like predetermined object data to determine whether the signature of the like predetermined object data is valid.

Terminology

"Permanent storage memory," as used herein, includes, but is not limited to, disk drive, flash RAM or bubble memory, for example.

"Object network," as used in the present invention, will include a network wherein the object server computer data is accessed via the following set of object system primitives: GET and PUT.

"Object" is a sequence of data of variable length.

"Sub-object" is a portion of an Object.

"Caching" is the function of maintaining a list of frequently accessed objects in a relatively high speed storage device that were retrieved from a relatively low speed device.

"Cache" is a set of objects which reside in permanent storage which are frequently retrieved from an object server.

"Object server computer" generally refers to a computer which includes a processor with its associated memory, an operating system, object data base, and a permanent storage memory.

"Get request" is the operation which takes place in order to fulfill an application program's need to retrieve an object and manifests itself as an "application interface" function and then as a recognizable data communications packet.

"Put request" is the operation which takes place in order to fulfill an application program's need to add a new object or to modify an object and manifests itself as an "application interface" function and then as a recognizable data communications packet.

DETAILED DESCRIPTION OF A PREFERRED EMBODIMENT

Figure 1:
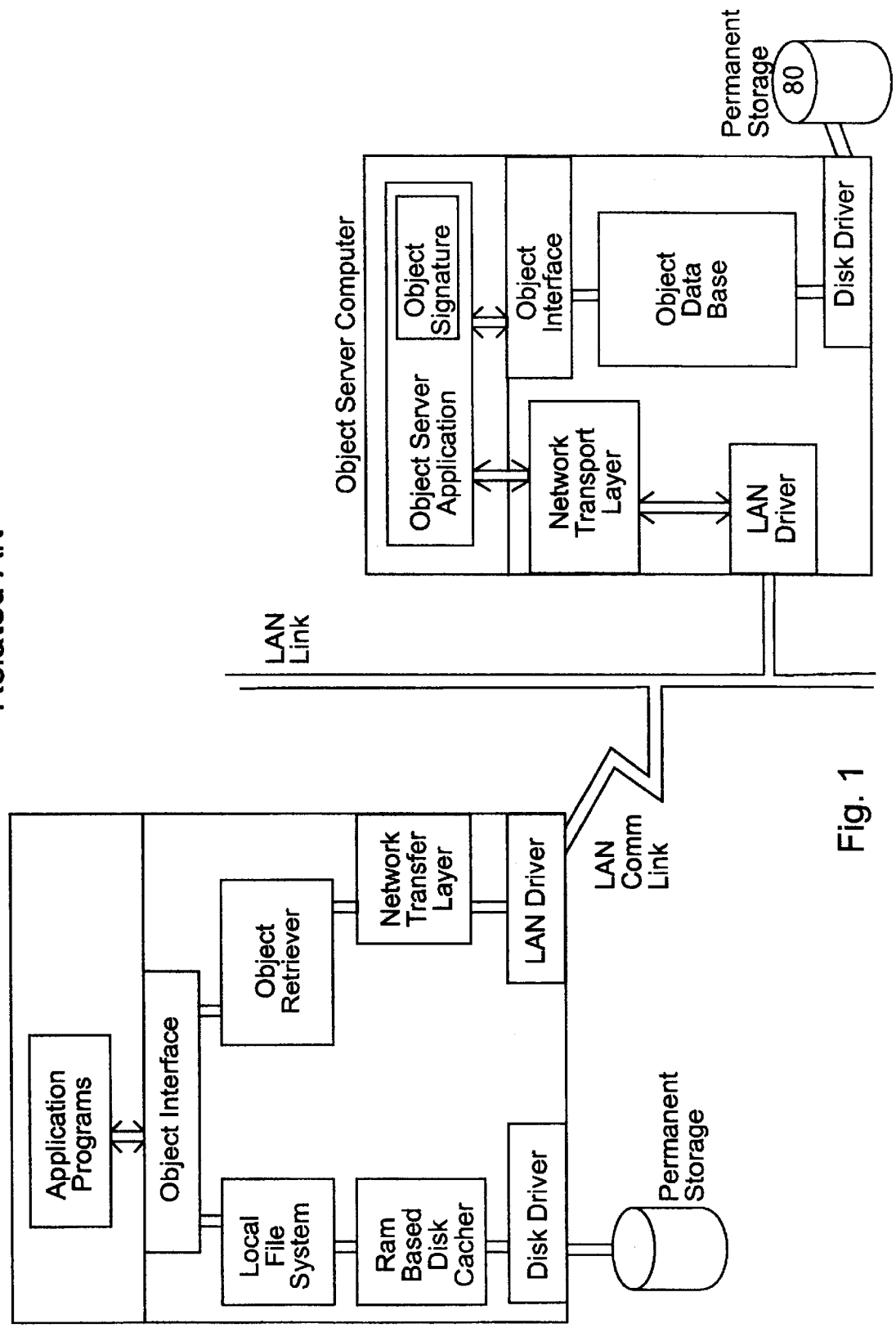
FIG. 1 illustrates the block diagram configuration of the related art.
Figure 2:
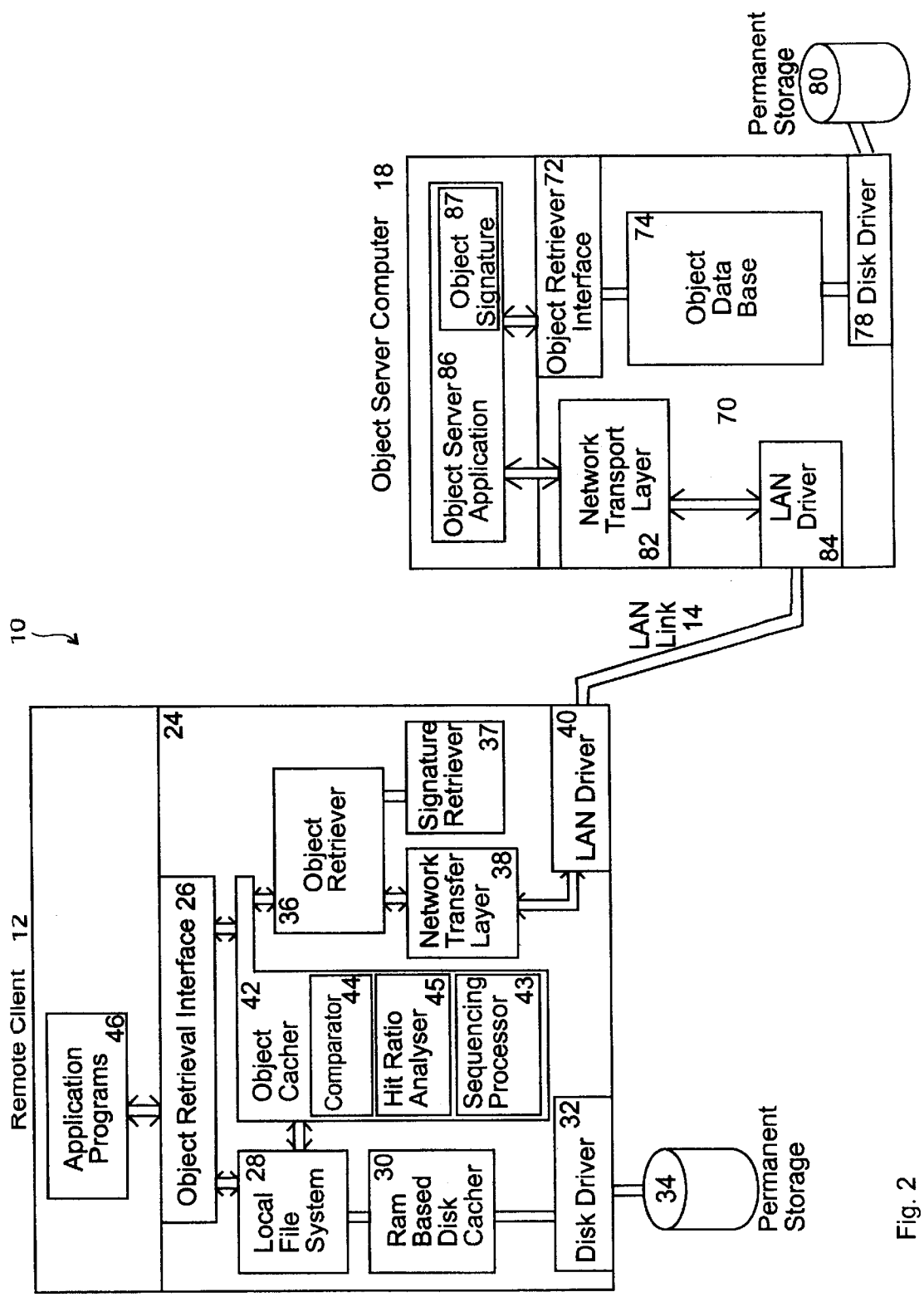
FIG. 2 illustrates the block diagram configuration of the present invention.

In the description which follows, the representation of the present invention is in part presented in terms of program operations executed on an object oriented distributed network of computers. The operations are steps leading to a certain result. Typically, these steps take the form of electrical signals which are manipulated, stored, transmitted, combined, compared or otherwise operated upon by a particular computer in the network. For simplicity, these signals may be referred to herein as bits, bytes or data.

The following description describes solutions to the problems associated with a remote client computer's ability to access specified data from an object server computer located on a network, for example. An apparatus and method are disclosed which permit the remote client computer to reduce the time for accessing such object data using a remote client computer having with a caching technique.

The performance gains realized by the present invention are derived from the fact that remote clients tend to repetitively access the same data by performing object GET. If a copy of the object data can be stored in the permanent storage memory of the remote client computer and also verified to be current when it is subsequently retrieved, this will improve performance significantly. This is because it requires much less bandwidth to verify a block of data than it would to actually transfer the object data.

Referring now to the figures, the present invention is a network computer system 10 having at least one remote client computer 12, communications link 14 (preferably a LAN LINK) and object server computer 18. The remote client computer 12 and object server computer 18 are connected via the LAN LINK 14. The LAN 20 can be Ethernet or Token Ring, for example. However, the remote client computer 12 could optionally communicate via a communication server of a type such as that provided by Cisco, 3Com, Shiva, etc., which will act as a router of traffic between the two as is understood in the art.

The remote client computer 12 has an operating system (OS) 24 with an object retrieval interface (OI) 26. Operatively connected to the OI 26 is a local file system (LFS) 28 which in turn is operatively connected to a RAM based disk cacher (RBDC) 30, disk driver (DD) 32 and permanent storage disk (PSD) 34. An object retriever (OR) 36 having a signature retriever (SR) 37, operatively connects to a network transport layer (NTL) 38 which in turn is connected to a LAN driver 40. Additionally, the invention includes an object cacher (OC) 42 which is operably disposed between and interconnects the OI 26 and OR 36. The OC 42 operatively connects to the LFS 28. The OC 42 includes a comparator (COM) 44 and optionally hit ratio analyzer (HRA) 45, which will be more fully described hereinafter. Aside from the OS 24, there exists on the computer 12 application programs (AP) 46 which employ the OS 24 via OI 26.

The object server computer 18 includes an OS 70 having an OI 72 which is operatively connected to an object database (ODB) 74 which in turn is associated with a DD 78 and a PSD 80. Also, the OS 70 includes an NTL 82 operatively connected to a LAN driver 84. An object server application (OSA) 86 exists on the computer 18 which is operably connected to both the NTL 82 and OI 72 and further includes an object signature generator (OSG) 87. Objects are stored in the ODB 74 and have associated signatures which are dependent on the nature of the object itself. For example, signature data may include a date/time stamp or integer value which is incrementally increased when updated. It should be noted that one skilled in the art can modify the basic network computer to accomplish the objects set forth herein and that such modifications are believed to fall within the scope of the claims appended hereto.

Figure 3:
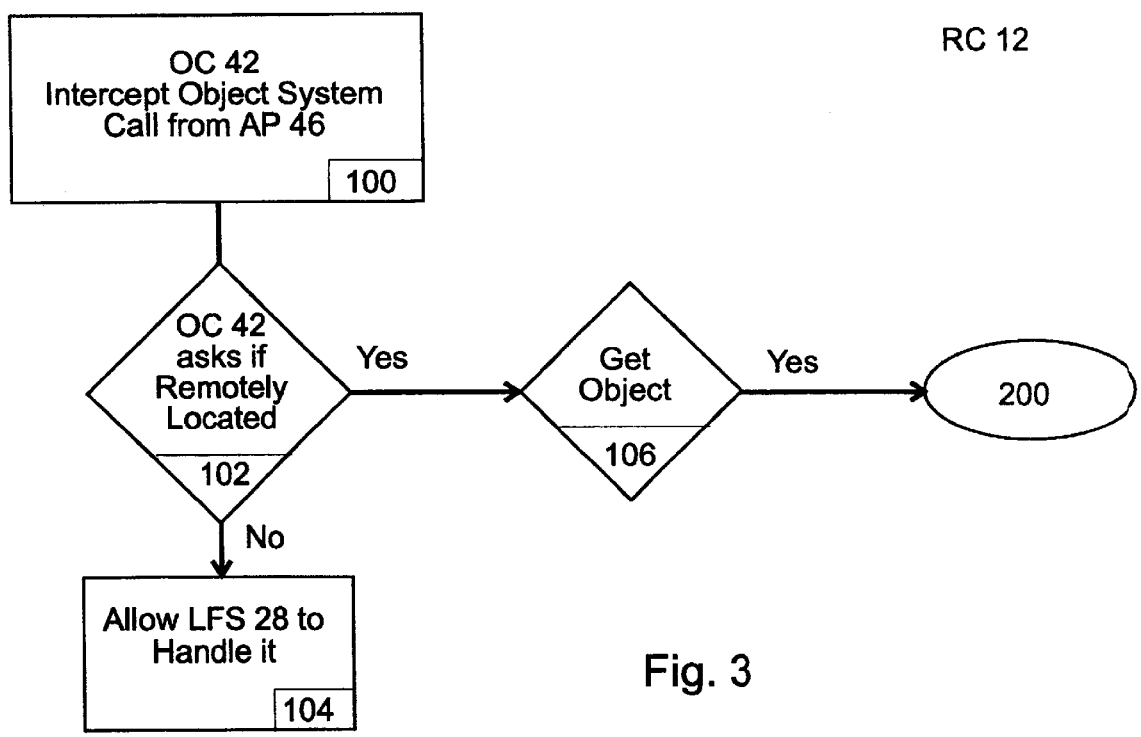
FIG. 3 illustrates a flow chart of a set of operations of the present invention corresponding.
Figure 4:
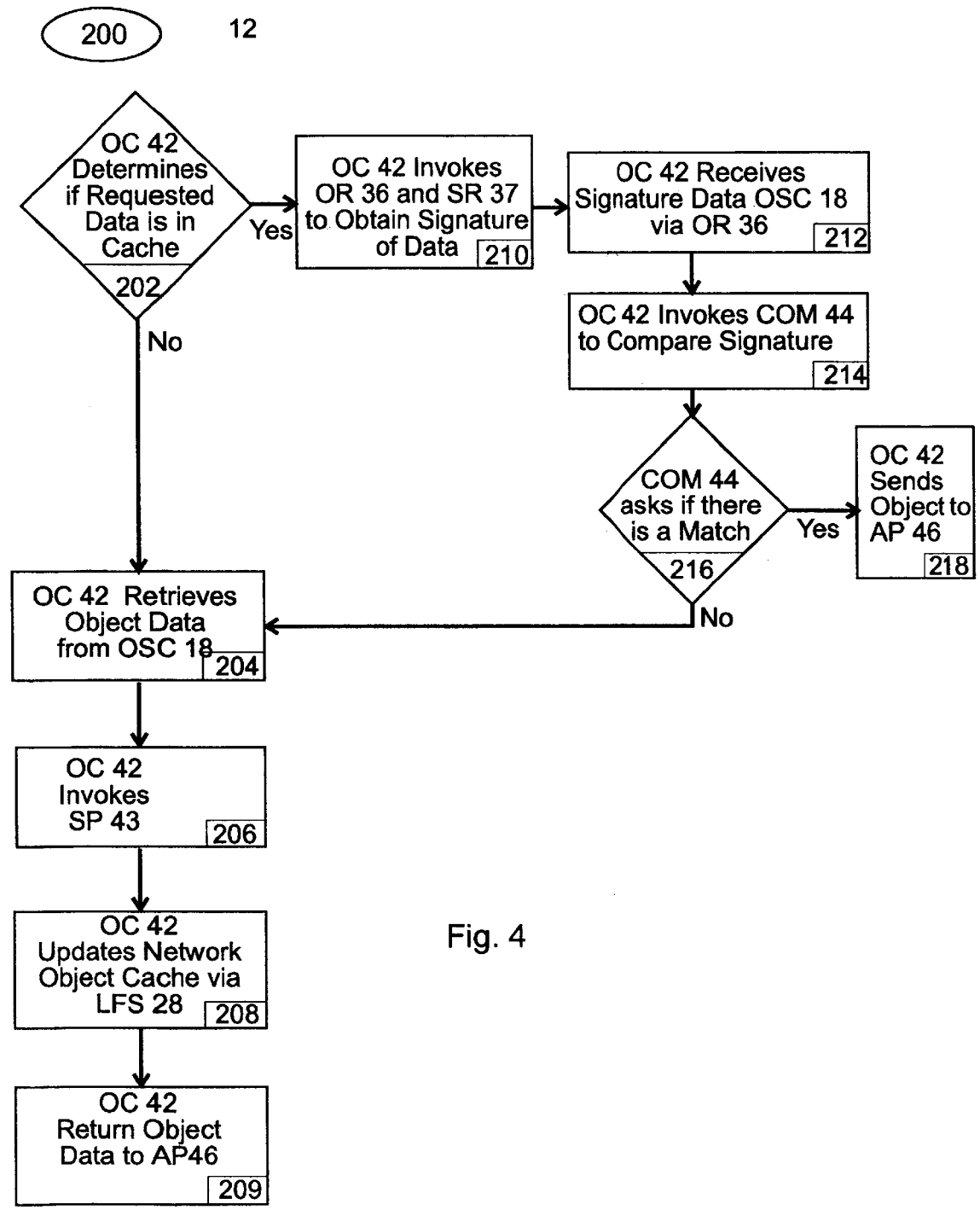
FIG. 4 further illustrates the flow chart of operations of FIG. 3.

The operation of the system is as follows and as represented in FIGS. 3. The operations discussed hereafter assumes connections have been made among all computers 12 and 18 via LAN LINK 14, for example.

On the remote client computer, AP 46 makes requests from an object server computer 18 wherein the OC 42 will intercept an object system call 100 from the AP 46 and query whether the object to be acted upon is "remotely located?" 102. If the answer is no, the OC 42 "instructs" 104 the LFS 28 to handle the object request. If yes, the OC 42 via the NTL 38 "sends" 106 a GET request to OSC 18 to obtain the object therefrom. The request is handled accordingly as follows.

Per the GET 108 request, the remote client computer 12 follows the operation 200. Via the OI 26 and LFS 28, the OC 42 "determines if the requested object data is in cache?" 202. If the answer is no, the OC 42 "retrieves" 204 the data via NTL 38 from the OSC 18. If the answer is yes and the object data is in cache of the LFS 28, OC 42 is triggered to "invoke" 210 the OR 36 to which in turn invokes the SR 37 to obtain signature of object data associated with such object data. OC 42 via OR 36 and NTL 38 "receives" 212 the object signature of object data from the OSC 18. OC 42 "invokes" 214 COM 44 to compare object signatures of data and "asks whether there is a match?" 216. If yes and there is a match of the signatures, OC 42 "sends" 218 cached object data to AP 46. If the answer is no, OC 42 "retrieves" 204 the object and associated signature data.

In this regard, a series of sub-objects are sent to the OC 42 which "invokes" 206 a sequencing processor SP 43 which orders the sub-objects being received from the OSC 18 into a contiguous data stream formulating the object for purposes of optimizing subsequent retrieval.

The OC 42 "updates" 208 the network object cache via LFS 28. The retrieved object is "returned" 209 by the OC 42 to AP 46.

The remote client computer 12 is also preferably designed with a predefined portion of its memory 34 operably associated with the OC 42 for storing "hit ratio" defined as the percentage of times that a GET request for a particular data was successfully verified to be in cache memory out of a predetermined number of attempted verifications. The remote client computer 12 employs HRA 45 as an operative means which keeps a record of object names that have been determined to be unworthy of caching because previously determined hit ratios fell below the predetermined threshold and, thus, future accesses of the data to such objects will be inhibited from being subject to the processes defined herein. In other words, the HRA 45 dumps data from cache memory if the data associated hit ratio was less than a predetermined number, otherwise the data remains in cache memory.

While the preferred embodiment has been set forth above, it is done so only by way of example and not intended to be limiting to the scope of the claims appended hereto. It is believed that modifications and variations of the present invention will be readily apparent to those skilled in the art and will be fall within the scope of the claims hereto.

What is claimed is:

1. An apparatus for increased data access in an object oriented network, which comprises:

an object server computer having an operating system, a first memory, a permanent storage memory and a processor with means for performing an operation on a predetermined object data stored in said permanent storage memory of said object server computer to produce an object server computer signature of said object data a processor element in said object server computer which recognizes a GET request by said remote client computer client computer for said predetermined object data and obtains said object data and an associated signature of said data; and a remote client computer operably associated with said object server computer having an operating system, a first memory, a cache memory and a processor with means for performing an operation on like predetermined object data stored in said cache memory and recalling signature of said like predetermined object data a processor element on said remote client computer which initiates upon a GET request from said cache memory therein and obtains said like predetermined object data having an associated signature of said object data, and a comparator operably associated with said remote client computer for comparing said signature of said predetermined object data with signature of said like predetermined object data to determine whether said signature of said like predetermined object data is valid.

2. The invention in accordance with claim 1, wherein said network object server includes means responsive to each said comparison performed by said comparator on said object data for generating and storing a validation ratio for said object data in a third memory and for removing said object data from said cache memory when said validation ratio drops below a predetermined value.

3. The invention in accordance with claim 2, wherein said storing and removing means is further defined to preclude said data having a validation ratio less than said predetermined value from reentering said cache memory.

4. A method, performed by computers in an object oriented network for increased speed of access of data, which comprises:

using an object server computer having an operating system, a first memory, a permanent storage memory and a processor with means for performing an operation on a predetermined object data stored in said permanent storage memory of said object server computer to produce an object server computer signature of said object data;

using a remote client computer operably associated with said object server computer having an operating system, a first memory, a cache memory and a processor with means for performing an operation on like predetermined object data stored in said cache memory and recalling signature of said like predetermined object data, and a comparator operably associated with said remote client computer for comparing said signatures of object data with one another to determine whether said signature of data of said remote client is valid;

establishing a processor element in said object server computer which recognizes a GET request by said remote client computer for said predetermined object data and obtains said object data and an associated signature of said data;

establishing a processor element on said remote client computer which initiates upon a GET request from said cache memory therein and obtains said like predetermined object data having an associated signature of said object data; and using a comparator operably associated with said remote client computer for comparing said signature of predetermined object data with said signature of said like predetermined object data to determine whether said signature of said like predetermined object data is valid.

5. The method of the invention in accordance with claim 4, which further includes the steps of:

establishing in said remote client computer a processor element responsive to each said comparison of said signature data;

generating a validation ratio for said object data;

storing said validation ratio in a third memory of said remote client computer; and removing said object data from said cache memory when said validation ratio drops below a predetermined value.

6. The method of the invention in accordance with claim 5, wherein the step of removing is further characterized to induce preventing said data from reentering said cache memory.

* * * * *

UNITED STATES PATENT AND TRADEMARK OFFICE
CERTIFICATE OF CORRECTION

PATENT NO. : 6,122,637  Page 1 of 1
DATED : September 19, 2000
INVENTOR(S) : Thomas Patrick Yohe and Brian C. Morris It is certified that error appears in the above-identified patent and that said Letters Patent is hereby corrected as shown below:

<u>Title page,</u>
Assignee data is added as follows:

Stampede Technologies, Inc
65 Rhoads Center Drive
Dayton, Ohio 45458

Signed and Sealed this

Twenty-fifth Day of December, 2001

Attest:

JAMES E. ROGAN
*Attesting Officer*    *Director of the United States Patent and Trademark Office*